INVENTOR
WILLIAM C. CHRISTINE
JOSEPH E. PIERCE

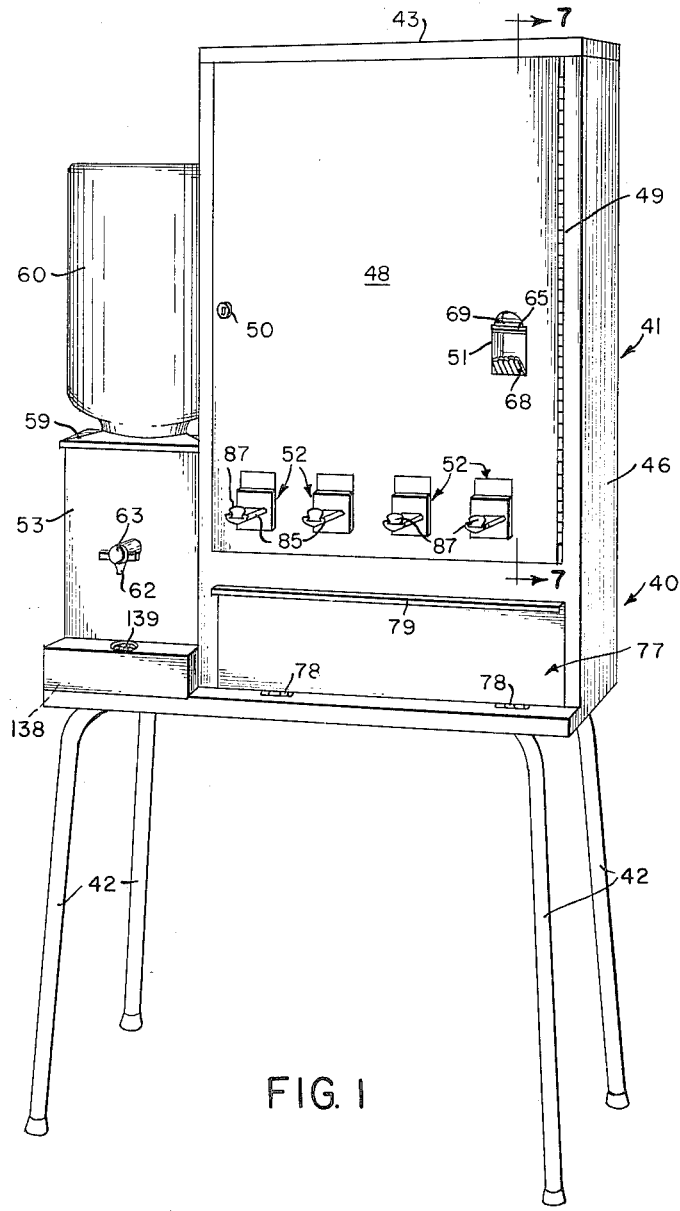
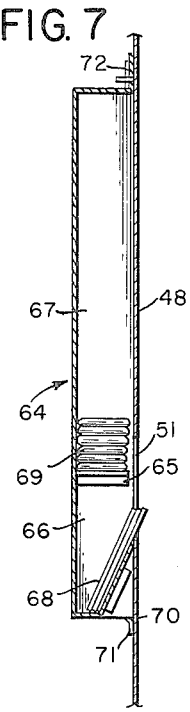
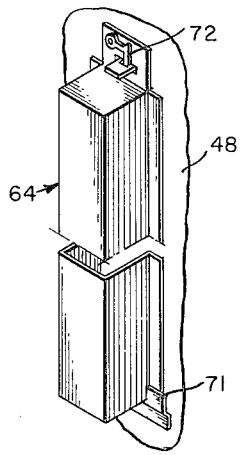

BY Sherman Levy ATTORNEY

April 26, 1966  W. C. CHRISTINE ETAL  3,247,940
MACHINE FOR VENDING CUPS CONTAINING POWDERED FOOD
Filed Oct. 12, 1964  4 Sheets-Sheet 3

INVENTOR
WILLIAM C. CHRISTINE
JOSEPH E. PIERCE
BY
*Sherman Lewis* ATTORNEY

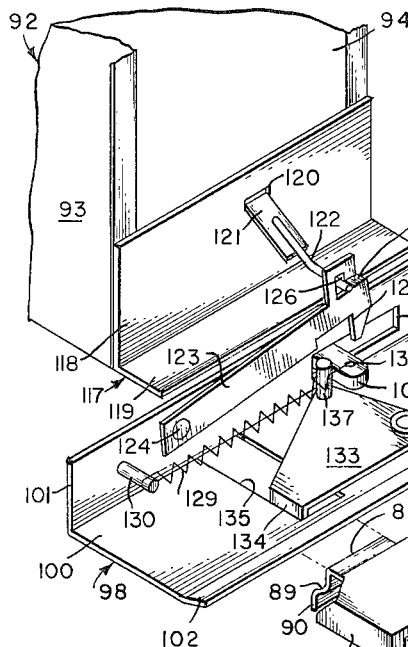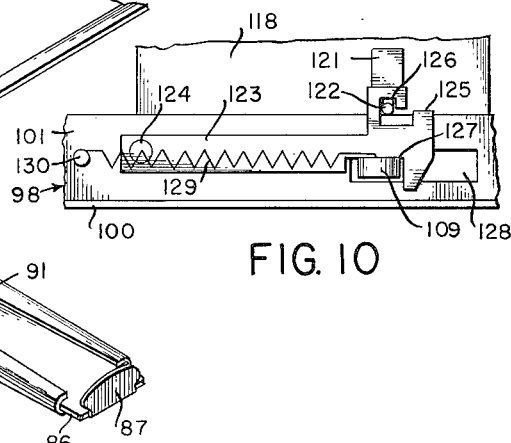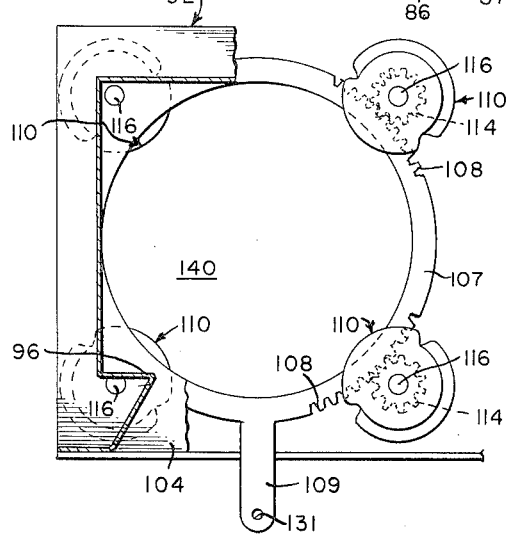

United States Patent Office 3,247,940
Patented Apr. 26, 1966

3,247,940
MACHINE FOR VENDING CUPS CONTAINING POWDERED FOOD
William C. Christine, Catasauqua, and Joseph E. Pierce, Allentown, Pa., assignors to Allen Electronics, Inc., Bethlehem, Pa., a corporation of Pennsylvania
Filed Oct. 12, 1964, Ser. No. 403,029
3 Claims. (Cl. 194—2)

This invention relates to a vending machine, and in particular to a coin operated vending machine whereby individual cups are dispensed upon insertion of a coin of the proper denomination, and wherein the individual cups each have a packet or package of food product therein such as powdered coffee, soup, chocolate, tea or the like which is to be subsequently mixed with and dissolved in a suitable quantity of water.

It is an object of this invention to provide a method of and means for dispensing individual cups from a stack of cups when a coin is inserted in the machine, and wherein the individual cups each have a package of dry powdered food product which is adapted to be used in such a manner that the ingredients of the package can be conveniently emptied into the cup, and then mixed with a suitable quantity of hot water which is conveniently available to provide the finished product.

Another object of this invention is to provide a coin operated vending machine which includes a means for preventing insertion of coins when the cup holders are empty, and wherein there is provided an improved cup vending mechanism which operates in a highly efficient manner to vend or dispense individual cups with the food packets when coins are inserted in the coin chutes.

Still another object is to provide a coin operated vending machine which is adapted to minimize errors productive of wasted labor and material in the formation of such machines, and wherein the vending machine can be used speedily and in a generally foolproof manner, and wherein the vending machine is rugged in structure and economical to manufacture and efficient in use.

Other and more particular objects, uses and advantages of this invention will become apparent from a reading of the following specification taken in connection with the accompanying drawings forming a part thereof, and wherein:

FIG. 1 is a perspective view of the vending machine of the present invention.

FIG. 7 is a sectional view taken on the line 7—7 of FIG. 1.

FIG. 8 is a fragmentary perspective view showing the container or holder for sugar and stirrers.

FIG. 9 is a fragmentary perspective view showing a portion of the cup vending mechanism in operating position.

FIG. 10 is a fragmentary front elevational view of the latch mechanism for the cup vending mechanism showing the parts in locked position.

FIG. 11 is an enlarged top plan view of the cup release mechanism, with parts broken away.

FIG. 12 is a perspective view of one of the cup release cam members.

Figure 2:
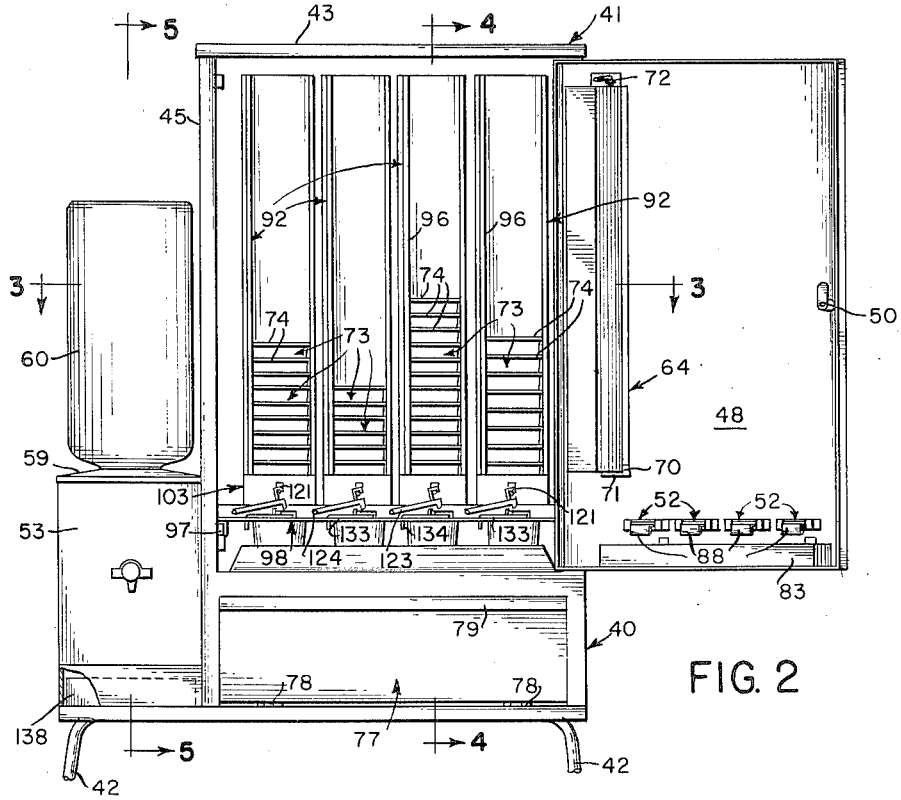
FIG. 2 is a front elevational view with the door of the cabinet shown in open position.

Referring in detail to the drawings, the numeral 40 indicates the vending machine of the present invention which includes a hollow cabinet that is indicated generally by the numeral 41, and the cabinet 41 of the coin operated vending machine is adapted to be supported on and affixed to suitable legs 42, FIG. 1. As shown in the drawings, the cabinet 41 includes horizontally disposed spaced parallel top and bottom walls 43 and 44, as well as spaced parallel vertically disposed side walls 45 and 46, FIG. 3. The cabinet further includes a vertically disposed back wall 47. The numeral 48 indicates a hingedly mounted front door, and the door 48 is hingedly supported as at 49, FIG. 4. The numeral 50 indicates a conventional key operated lock which is suitably mounted in the door 48 so that it is necessary to use the proper key to open the lock 50 in order to gain access to the interior of the cabinet 41, as for example when it is desired to remove the coins or money from the vending machine, or when it is desired to replace the merchandise that has been used during the operation of the machine. The door 48 is also provided with an opening or cut-out 51 for a purpose to be later described, FIG. 1. As shown in the drawings, a plurality of similar coin chutes 52 are mounted in the lower portion of the door 48, and these coin chutes 52 may have suitable indicia or printed matter arranged thereabove to indicate various types of food products that are to be dispensed such as coffee, soup, chocolate or the like.

Figure 5:
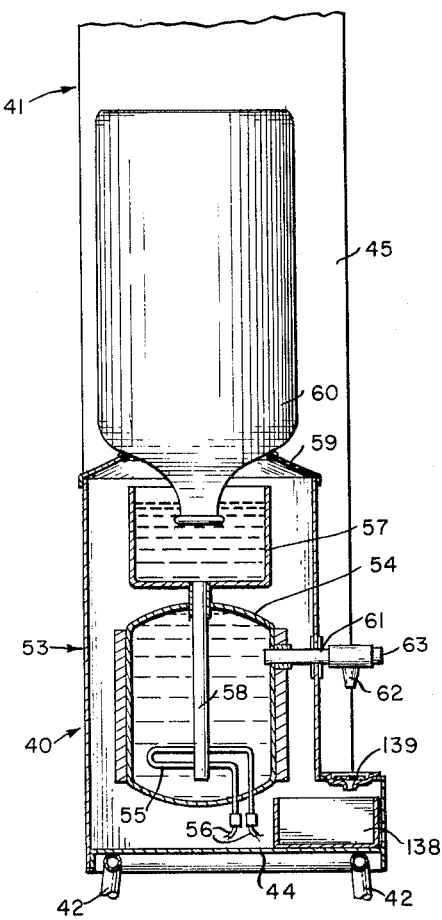
FIG. 5 is an enlarged sectional view taken on the line 5—5 of FIG. 2.

The vending machine of the present invention further includes a hollow housing or casing 53 which has a water container 54 arranged therein, FIG. 5. The numeral 55 indicates an electrically operated heater that is adapted to be arranged in the container 54, and the heater 55 is adapted to be connected to a suitable source of electrical energy by means of the wires or conductors 56. The numeral 57 indicates a receptacle or container that is supported above the container 54, and a tube or pipe 58 depends from the container 57 and projects into the container 54 as shown in the drawings. The numeral 59 indicates a cover for the heater housing 53, and a water bottle or jar 60 is adapted to be supported as shown in FIG. 5 so that water can flow down through the neck of the inverted bottle 60 by gravity into the container 57.

There is further provided an outlet tube or fitting 61 which has its inner end communicating with the receptacle 54, and a manually operable valve 63 is provided for controlling flow of hot water from the receptacle 54 through the tube 61 and down through the nozzle 62.

As shown in FIGS. 7 and 8 there is provided a container which is indicated generally by the numeral 64, and the container 64 is hollow and has an intermediate partition 65 which defines within the container 64 lower and upper compartments 66 and 67. The lower compartment 66 is adapted to have a plurality of wooden stirrers 68 arranged therein, and the upper compartment 67 is adapted to have a plurality of sugar containers or packages 69 arranged therein. The container or receptacle 64 is detachably connected to the inner surface of the door 48, and for example there is provided interengaging portions 70 and 71 for detachably connecting the lower end of the member 64 to the door 48, and there is provided a releasable hook mechanism 72 for maintaining the upper end of the unit or member 64 in its proper position against the inner surface of the door 48.

The numeral 73 designates each of a plurality of stacked superimposed cups which are of conventional construction and which are adapted to be made of a suitable material such as paper, cardboard or the like, and the cups 73 each include an upper circular bead or rim 74. The numeral 75 indicates a small packet or package which is arranged in each cup 73, and the packets 75 are each provided with removable closures or lids 76. The packets 75 are adapted to hold or contain a suitable quantity of a dry powdered food product such as powdered coffee, tea, soup, chocolate or the like.

Figure 4:
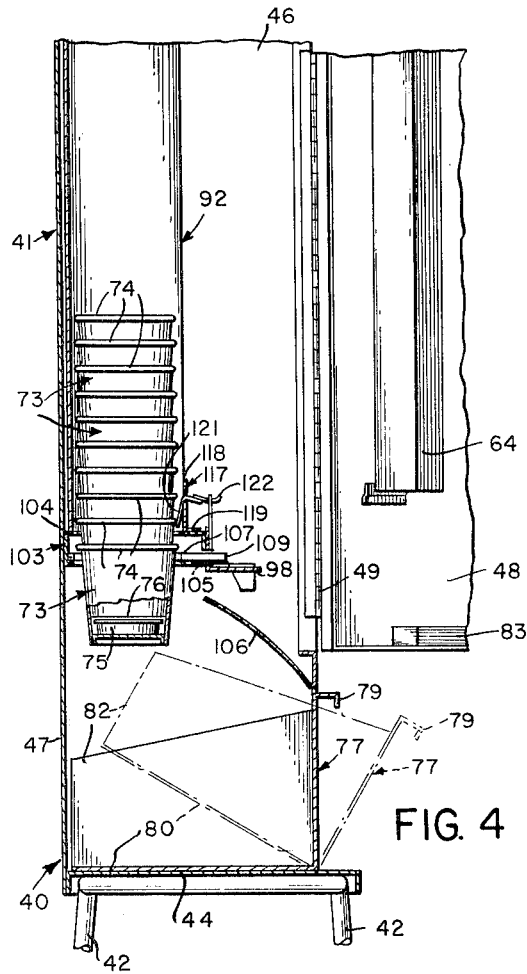
FIG. 4 is an enlarged sectional view taken on the line 4—4 of FIG. 2.
Figure 6:
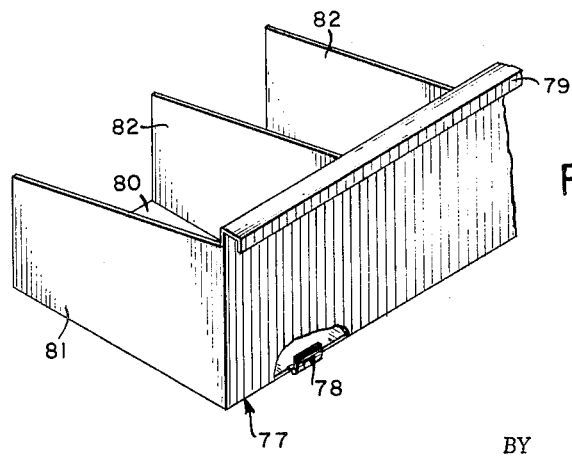
FIG. 6 is a fragmentary perspective view showing a portion of the cup receiving container or tray.

As shown in FIGS. 4 and 6, there is provided a receiver or tray which is indicated generally by the numeral 77, and the tray 77 is hingedly connected to the lower portion of the cabinet 41 by means of hinges 78. The tray 77 is provided with a finger engaging portion 79 which facilitates manual tilting of the member 77 as, for example, when the dispensed cup 73 with the food packet 75 therein is to be removed. The tray 77 includes a bottom portion 80 as well as side portions 81 and there is further provided intermediate partitions or panels 82.

The numeral 83 indicates a coin receiver or box which is mounted contiguous to the lower inner surface of the door 48, and the box 83 is adapted to be used for receiving coins which are inserted in the chutes 52 whereby these coins can subsequently be removed from the coin box 83 when the door 48 is unlocked by use of a proper key in the lock mechanism 50.

As shown in FIG. 9, the coin chutes 52 include a mounting portion 84 as well as a stationary element 85 and the numeral 86 indicates a movable lever which has an upstanding finger engaging portion 87 on the outer end thereof, and the inner end of the movable lever 86 is provided with a downwardly extending portion 88 that has a recess 89 which defines a shoulder or lip 90. The lever 86 is provided with a circular opening 91 which is of the proper size to receive a coin of the proper denomination to properly actuate the device, and the chute 52 is constructed so that unless the coin of the proper denomination is inserted in the recess or opening 91, the lever 86 cannot be manually pushed in so that the product cannot be dispensed.

Figure 3:
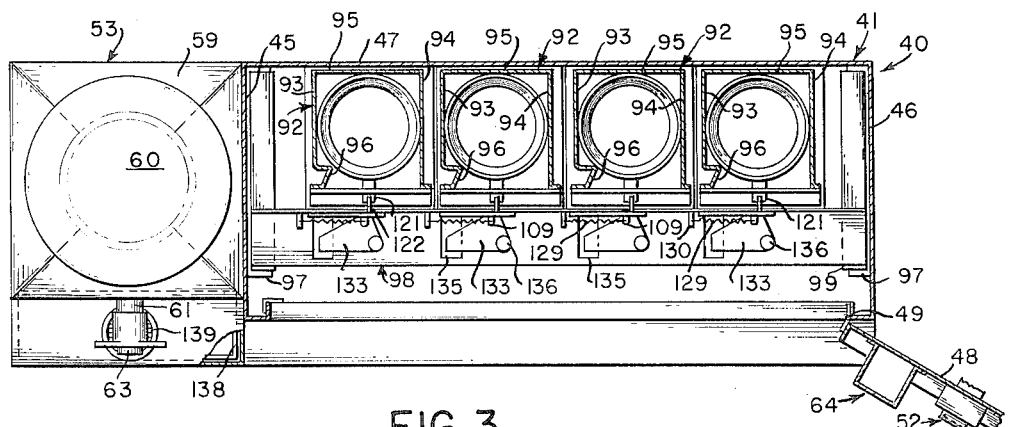
FIG. 3 is an enlarged horizontal sectional view taken on the line 3—3 of FIG. 2.

There is further provided a plurality of upstanding cup holders which are each indicated by the numeral 92, FIG. 3, and each of the cup holders 92 has generally the same construction and each comprises spaced apart side sections 93 and 94 as well as an upstanding back section 95. The side section 93 is provided with an inwardly projecting portion or shoulder section 96 as shown in the drawings.

The numeral 97 designates each of a pair of horizontally disposed brackets which are suitably secured as by welding to the inner surfaces of the side walls 45 and 46 of the cabinet 41, and a horizontally disposed bar 98 has L-shaped pieces 99 suitably affixed to the ends thereof, and the pieces 99 are adapted to engage the brackets 97 as shown in FIG. 3 for example so that the bar 98 will be properly supported in its proper location. The bar 98 includes a horizontally disposed bottom or base portion 100 as well as an upstanding back portion 101 and an angularly arranged or offset front portion 102.

The numeral 103 indicates a frame section contiguous to the lower end of each of the cup holders 92, and the frame section 103 includes horizontally disposed spaced parallel plates 104 and 105. The numeral 106 indicates an inclined baffle or wall member which is arranged as shown in FIG. 4.

The numeral 107 indicates a ring member which forms part of the cup vending mechanism, and the ring member 107 has a construction and operation which is somewhat similar to the circular gear member or ring member 84 shown and described in prior Patent 3,133,671. Thus, as shown in FIG. 11 the ring or gear member 107 includes spaced apart sets of teeth 108 as well as a finger or cup drop ratchet arm 109. The numeral 110 indicates a cam member or cam element which includes a cylindrical body portion 111 as well as upper and lower lips or cam surfaces 112 and 113, and the lower portion of the cam member 110 includes an integral gear section 114 which is adapted to have its teeth mesh with the teeth 108 of the ring or gear member 107 as shown in FIG. 11. The cam member 110 has a central aperture 115 for the projection therethrough of a securing element or pivot pin 116.

The numeral 117 indicates L-shaped plate pieces which are secured as by welding to the lower front portion of the cup holders 92, and the plate pieces 117 include upstanding sections 118 as well as horizontal sections 119, and the upstanding sections 118 are each provided with a slot 120 which has an empty lock out arm movably mounted therein, and this empty lock out arm is indicated by the numeral 121, and the arm 121 extends through the slot 120 in the portion 118 as shown in FIG. 9. A pin 122 is secured as by welding to the front portion of the empty lock out arm 121. The numeral 123 indicates a front lock out arm which is pivotally connected as at 124 to the upstanding portion 101 of the bar 98, and the arm 123 has a transverse lug portion 125 for selective engagement with the upper edge of the portion 101 of the bar 98. The arm 123 has a portion 126 for connection to the pin 122 that is affixed to the arm 121.

The arm 123 is provided with a recess 127, and the portion 101 of the bar 98 is provided with slots 128, and the cup drop ratchet arms 109 are movably mounted in the slots 128. The arm 109 is selectively engageable by the slotted or recessed portion 127 of the arm 123 as later described in this application.

The numeral 129 indicates a cup drop return spring which has one end connected to a securing element 130 that is affixed to the portion 101 of the bar 98, and the other end of the spring 129 is anchored as at 131 to the ratchet arm 109.

The numeral 133 indicates a cup feed arm which has a downwardly extending portion or flange 134 that is mounted for movement or travel in a slot 135 of the portion 100 of the bar 98, FIG. 9. The flange 134 of the arm 133 is adapted to be engaged by and coact with the downwardly extending inner end portion 88 of the coin chute lever 86. The arm 133 is pivotally connected to the portion 100 of the bar 98 as at 136. The numeral 137 indicates an upstanding pin or lug which is secured to or formed integral with the cup feed arm 133.

As shown in FIG. 5, the numeral 138 indicates a drain box or member which is arranged below a cup support 139.

From the foregoing, it will be seen that there has been provided a coin operated vending machine which is especially suitable for vending food products such as hot chocolate, coffee, soup, tea or the like. In use, with the parts arranged as shown in the drawings, it is to be noted that the vending machine includes the cabinet 41 which may be suitably supported in a desired manner as, for example, by means of the legs 42. When the machine is to be serviced or filled with merchandise, the proper key is inserted in the lock 50 whereby the lock 50 is opened and then the door 48 can be swung open on its hinges 49 so that the door 48 can move from a closed position such as that shown in FIG. 1 to an open position such as that shown in FIGS. 2, 3 and 4 whereby with the door in open position, a person has access to the interior of the cabinet. The proper number of cups 73 are adapted to be loaded or placed in the cup holders 92, and these cups 73 are of the type which each include the upper rim or bead 74, and each cup 73 has a small packet of dry powdered food product therein and these packets are indicated by the numeral 75 in FIG. 4. Thus, it will be seen that each of the cup holders 92 has a plurality of stacked superimposed cups 73 therein and each of these cups has its own food packet 74 which has been positioned therein before the cups are loaded in the machine. The cup holders 92 are constructed so that they are closed on two sides and at the back and the front is open and one of the sides 93 has the inwardly projecting shoulder portion 96 and this construction serves to permit the cups to be readily inserted into the cup holders, and in addition this shoulder portion 96 serves to insure that the cups will not accidentally fall out of their proper place.

The electric heater 55 is adapted to be connected to a suitable source of electrical energy by means of the wires or conductors 56, and the bottle or jar 60 is adapted to be filled with water from a suitable source of supply and then the bottle 60 is inverted so that the water can flow down by gravity through the neck of the bottle as shown in FIG. 5 and this water will then be received in the container 57. This water in the container 57 then can flow downwardly through the tube 58 and enter the container 54 and the water in the container 54 will be heated by the electric heater 55. Then, when it is desired to dispense a quantity of hot water into a cup 73, the cup 73 is adapted to be positioned on the support 139 and the valve or button 63 is manually depressed so that the desired quantity of water will flow out from the container 54 up through the pipe 61 and be dispensed downwardly through the nozzle 62 into the cup therebelow. This hot water can be used for dissolving the ingredients which are emptied into the cup from the packet 75. The packet 75 has the readily removable closure or lid 76 thereon so that by manually removing the closure 76, the contents of the packet 75 can be emptied into the cup and mixed with the hot water in the desired manner.

When the consumer desires to add sugar to the ingredient, as for example when coffee is being vended or dispensed, the consumer or person can conveniently insert the fingers through the opening 51 and remove one or more of the sugar packages 69 from the chamber 67, and in addition it will be seen that the wooden stirrers 68 are also accessible through the opening 51 so that such stirrers can be used for more efficiently mixing the hot water and powdered food products which are to be consumed.

When the supply of sugar packages 69 and stirrers 68 need replacement or replenishment, it is only necessary to disengage the hook mechanism 72 and disengage the portions 70 and 71 whereby the container or receptacle 64 can be readily removed or detached from the door 48 so that additional and desired quantity of sugar packages 69 and food stirrers 68 can be loaded into the unit 64, and then the unit 64 is returned to its proper position against the inner surface of the door, and this member 64 is held in place by the hook mechanism 72 and interengaging portions 70 and 71.

The coins which are used for operating the machine are adapted to be inserted initially in the openings 91 of the respective coin chutes 52, and then manual pressure is applied to the upstanding portion 87 on the outer end of the lever 86 so that the lever 86 moves inwardly to cause the portion 88 to coact with the downturned lug 134 of the arm 133 as later described in this application. The coin chutes 52 are constructed so that unless the coin of the proper denomination is inserted in the opening 91, then the lever 86 cannot be actuated, so that the merchandise can only be dispensed by use of the proper coin. The coins which are used for operating the machine drop into the coin box 83 and the coin box 83 is mounted in the lower portion of the door 48 adjacent the inner surface thereof so that access can only be gained to the coin box 83 by using the proper key in the lock 50 to open the machine.

When the water in the bottle 60 is used up, the bottle 60 can be readily lifted off of or removed from the top of the housing 53, and then the bottle 60 can be refilled with water and returned to its proper position as shown in FIG. 5. Any excess water which runs over the side of the cups being filled with hot water, or any excess water which inadvertently drips down through the nozzle 62 will pass through the reticulated member 139 and be convenienty received in the drain box or unit 138 and the unit 138 can be mounted so that it can be removed if desired in order to empty the same.

The various parts can be made of different materials and in different shapes or sizes as desired or required.

It is to be understood that one of the cup holders 92 may be provided with a quantity of cups having coffee packets 75 therein, while others may have soup, chocolate, tea and the like therein so that a person can obtain the food product desired.

The operation of the cup vending mechanism is as follows. When the proper coin is inserted in the opening 91 of the coin chute 52, and finger pressure is applied to the finger portion 87, the lever 86 can move inwardly to push the portion 88 against the downwardly extending flange or leg 134 of the coin feed arm 133 so that the arm 133 can pivot about an axis extending through its pivot pin 136, and the slot 135 provides sufficient clearance for the leg 134 to move from the front to the rear. As the arm 133 pivots, its pin 137, FIG. 9, engages the side of the cup drop ratchet arm 109 to move the arm 109 from left to right in FIG. 9 and this movement of the arm 109 causes rotation of the gear member 107 because the gear member 107 and arm 109 are of integral construction as shown in FIGS. 11. As the gear or ring member 107 rotates, it causes corresponding rotation of the plurality of cam members 110 because the teeth 108 of the member 107 are in meshing engagement with the gear section 114 of the cam members 110, so that this will result in rotation of the cam members 110 about the pivot pins 116. As the cams 110 rotate, they will release the bottom cup 73 due to the arrangement of the cam or lip surfaces 112 and 113 which coact with the bead 74 of the lower or bottom cups 73. As the bottom cup 73 is released, the surfaces 112 and 113 of the cam members 110 will grab and hold the next cup 73 thereabove to prevent the next higher cup from falling into the tray 77.

When the lever 86 is pulled out by finger pressure on the portion 87, the cup drop return spring 129 will exert sufficient pressure on the cup drop ratchet arm 109 to move the arm 109 through the slot 128 from right to left to return the parts to the position shown in FIG. 9 and this will also return the feed arm 133 to the position shown in FIG. 9 due to the interengagement of the arm 109 and pin 137. When this occurs, the lower lip 113 of the cam members 110 serves to hold the next cup in place until this cup is to be vended or dispensed.

After a cup 73 with the packet 75 therein is dispensed into the tray 77, and with the tray 77 in the solid line position shown in FIG. 4, it is only necessary to manually grip the portion 79 and then tilt the drawer or tray 77 from the solid line position shown in FIG. 4 to the broken line position of FIG. 4 whereby the vended cup with the food packet therein slides to the front of the drawer 77 so that the cup can be readily and easily removed. The partitions 82 in the drawer 77 define separate compartments so that, for example, one of these compartments will function to receive coffee, while another one will function to receive soup, chocolate or the like since these compartments are arranged below the respective cup holders 92 which contain these different products or ingredients therein. After removing the cup 73 from the drawer 77, the packet 75 is taken out of the cup, and the closure 76 is removed from the packet and the ingredients of the packet 75 are dumped or emptied into the cup and then the cup with the dry material is adapted to be positioned on the support piece 139 whereby by manually depressing the valve or button 63, the desired quantity of hot water will be dispensed into the cup for use in making hot coffee, hot soup, hot tea, hot chocolate or the like.

After the vended cup has been removed from the drawer 77, when manual pressure is released on the portion 79, the drawer 77 will return from the broken or dotted line position shown in FIG. 4 to the solid line position of FIG. 4 ready to receive the next cup that is vended.

Suitable indicia may be arranged on the front surface of the door to show which coin chutes are to be actuated in order to vend the various products, and in addition indicia or printed matter may be arranged contiguous to the opening 51 and also on the drawer 77 to indicate to the consumers the proper method of using these parts.

There is further provided a mechanism which prevents operation of the machine when the supply of cups is used up so that there will be no loss of coins by the consumers when a particular cup holder is empty. This lock out mechanism includes the empty lock out arm 121 which is movably mounted in the slot 120 of the plate 117 so that when there are no more cups 73 left in a particular cup holder 92, this mechanism will be actuated. Normally as long as there are cups 73 in the cup holders 92, these cups will bear against the inner portion of the lock out arm 121 to maintain the arm 121 in a raised position, and with the arm 121 in raised position, the pin 122 will maintain the front lock out arm 123 in raised position, because the arm 123 is pivotally mounted by means of the pin 124. With the arm 123 in raised position, the recess 127 will be above the cup drop ratchet arm 109 so that there will be no interference with sliding back and forth movement of the arm 109 in the slot 128. However, when the supply of cups is exhausted, there will be nothing to maintain the empty lock out arm 121 in this position so that the outer portion of the arm 121 can drop downwardly to cause and permit the arm 123 to pivot downwardly on its pivot 124 whereby the recessed portion 127 will snugly engage the arm 109 to prevent movement of the arm 109 and this will prevent pivotal movement of the arm 133 which in turn will prevent sliding movement of the lever 86 so that coins will not be able to move into the interior of the machine when the supply of cups is empty.

In FIG. 9 there is illustrated a portion of the cup vending mechanism which is adapted to coact with a coin deposit mechanism. The mechanism includes the operating plate 133 which has the downwardly projecting flange 134 as previously described. The coin operated vending machine of the present invention is adapted to be made at a relatively low cost and is constructed so that it will give trouble-free service for long periods of time. As shown in FIG. 6, the drawer 77 is provided with the dividers or partitions 82 so that the different products from the different cup holders 92 will be received in their own separate compartment between these dividers. With further reference to the cup vending mechanism, normally the lip 113 of the cams 110 are disposed in the opening or space indicated by the numeral 140, FIG. 11, and the opening 140 indicates the opening through which a cup 73 will fall when the machine is actuated. With the lip 113 projecting into a portion of the opening or space 140, the lips 113 will engage the bead 74 on the lowermost cup 73 of the stack of cups to retain the stack of cups in position. When the ring 107 is rotated as previously described by insertion of the proper coin in the coin mechanism, the teeth 108 of the ring 107 will engage the gear sections 114 on the bottom of the cam members 110 so as to rotate all of the cam members 110 simultaneously. Rotation of these cam members 110 moves the lower lip 113 from beneath the bead 74 of the lowermost cup 73 to thereby permit the lowermost cup to fall by gravity into the product container or drawer 77. The upper cam 112 will be rotated into the path of travel of the remaining cups in the stack and the lip 112 will thus prevent the passage of these cups through the opening 140. When the ring 107 is returned to its initial position, the upper cam surface 112 will be withdrawn from the opening 140 and hence will move out of the path of the stack of cups so that the stack can fall until the lip or bead 74 of the lowermost cup engages the bottom lip 113 of the cam members 110 and thus the cycle is adapted to be repeated continuously.

Minor changes in shape, size, and rearrangement of details coming within the field of invention claimed may be resorted to in actual practice, if desired.

What is claimed is:

1. In a coin operated vending machine for vending an individual cup with a package of powdered food product therein, a cabinet having at least one cup holder therein, a door hingedly connected to said cabinet, said cup holder having a stack of superimposed cups therein, and said cups each having a circular bead on their upper edge, each of said cups having a packet of dry powdered food product therein, and each packet having a removable closure thereon, a coin chute operatively connected to said door, and means for dispensing and vending said cups one at a time when the coin chute is actuated with a coin of the proper denomination, and wherein when the machine is actuated with the coin, a cup is vended which has a packet of food product therein and said packet adapted to be removed from the cup so that the food product can be emptied into the cup for mixture with a quantity of hot water, said means comprises a lever movable in said chute, a bar arranged in said cabinet and having a slot therein, a cup feed arm pivotally connected to said bar and having a depending portion for engagement and coaction with the inner end of said lever, a pin on said cup feed arm, a rotary ring member having an integral cup drop ratchet arm selectively engageable by said pin, a cup drop return spring connected to said arm, said ring member having sets of spaced apart teeth thereon, and a plurality of rotary spaced apart cam members each having gear sections thereon meshing with the teeth of said ring member, and said cam members having upper and lower cam surfaces providing lips for engagement with the beads of said cups to permit and cause only one of said cups to be dispensed and vended upon insertion of a coin of the proper denomination in the coin chute.

2. A coin operated vending machine for vending a cup with a package of powdered food product therein, comprising a cabinet having at least one cup holder therein, a door hingedly connected to said cabinet, said cup holder having a stack of superimposed cups therein, and said cups each having a circular bead on their upper edge, each of said cups having a packet of dry powdered food product therein, and each packet having a removable closure thereon, a coin chute operatively connected to said door for each cup holder, means for dispensing and vending said cups one at a time when the coin chute is actuated with a coin of the proper denomination therein, and whereby a cup is vended which has a packet of food product therein, and said packet adapted to be removed from the cup so that the food product can be emptied into the cup for mixture with a quantity of hot water, said means comprising a lever movable in said chute, a bar arranged in said cabinet and having a slot therein, a cup feed arm pivotally connected to said bar and having a depending portion for engagement and coaction with the inner end of said lever, a pin on said cup feed arm, a rotary ring member having an integral cup drop ratchet arm selectively engageable by said pin, a cup drop return spring connected to said arm, said ring member having sets of spaced apart teeth thereon, a plurality of rotary cam members each having gear sections meshing with the teeth of said ring member, and said cam members each having upper and lower lips for engagement with the beads of said cups to cause only one of said cups to be dispensed and vended upon insertion of the proper coin in the coin chute, and a tiltable tray for receiving said cups.

3. In a coin operated vending machine, a hollow cabinet including horizontally disposed spaced parallel top and bottom walls, spaced parallel vertically disposed side walls, and a back wall, a hingedly mounted door at the front of said cabinet, a key operated lock for said door, said door having an opening therein, a plurality of coin chutes mounted in the lower portion of said door, a housing adjacent the side of the cabinet, a hollow water tank in said housing and said water tank having an electrically operated heater therein, a receptacle arranged above said tank, a conduit depending from said receptacle and communicating with said tank, an outlet line connected to said tank, a manually operable valve connected to said outlet line, a discharge nozzle depending from said outlet line, a drain box below said discharge line, a support member above said box having a screen thereon, a water container supported above said receptacle and said water container adapted to hold a quantity of water, a container unit detachably connected to the inner surface of said door and said container unit having upper and lower compartments for holding packages of sugar and stirrers, and said sugar packages and stirrers being arranged adjacent the opening in the door, a tiltable tray hingedly mounted in the lower portion of said cabinet for receiving cups which each have a single portion package of food product arranged therein, said tray including spaced parallel side portions, a front portion having a finger engaging piece thereon, and dividers in said tray, cup holders arranged in said cabinet and said cup holders each adapted to support a plurality of stacked cups therein and wherein each cup has a single portion packet of dry powdered food product therein, brackets mounted in said cabinet, a horizontally disposed bar having angle pieces engaging said brackets, frame sections adjacent the lower portion of the cup holders, a ring member interposed in said frame section and said ring member having spaced apart sets of teeth thereon, a plurality of cam members having gear sections meshing with the teeth of the ring member, said cam members having upper and lower lips for selectively engaging beads on the tops of the cups, L-shaped plate pieces affixed to the lower front portions of the cup holders and said plate pieces having slots therein, an empty lock out arm projecting through each of said last named slots, a front lock out arm pivotally connected to said bar and said front lock out arm having a transverse lug for selective engagement with a portion of the bar, there being a pin projecting forwardly from said empty lock out arm and connected to said front lock out arm, there being a recess in the lower portion of the front lock out arm, slots in said bar, cup drop ratchet arms integral with said ring member and projecting through said last named slots, and said cup drop ratchet arms being selectively engageable by the recesses of the front lock out arm, the cup drop return spring having one end connected to said ratchet arm and its other end anchored to said bar, a cup feed arm pivotally connected to the bar, said bar having other slots therein, downwardly extending portions depending from said cup feed arms and movably extending through the last named slots, said coin chutes including a movable lever which has an upstanding outer finger engaging portion and a downturned inner end portion which is adapted to coact with and engage the downwardly extending portion of the cup feed arm.

References Cited by the Examiner

UNITED STATES PATENTS

| | | | |
|---|---|---|---|
| 1,798,339 | 3/1931 | Soulis. | |
| 2,029,460 | 2/1936 | Brady | 222—2 |
| 2,729,376 | 1/1956 | Gould et al. | 221—96 |
| 3,098,585 | 7/1963 | Giepen | 221—222 X |
| 3,121,636 | 2/1964 | Toms | 99—78 |
| 3,133,671 | 5/1964 | Christine et al. | 221—223 X |
| 3,186,850 | 6/1965 | Anthony | 99—78 |

OTHER REFERENCES

Modern Packaging, August 1954, page 79.

RAPHAEL M. LUPO, *Primary Examiner.*

LOUIS J. DEMBO, *Examiner.*

S. TOLLBERG, *Assistant Examiner.*